United States Patent [19]
Albrecht

[11] 3,918,071
[45] Nov. 4, 1975

[54] AUTOMATIC LENS FOCUSING METHOD AND APPARATUS

[76] Inventor: Fritz Albrecht, R.F.D. Rte. 4, Box 240, Brevard, N.C. 28712

[22] Filed: Apr. 11, 1974

[21] Appl. No.: 460,122

[52] U.S. Cl. .................. 354/25; 352/140; 354/200
[51] Int. Cl.² ........................................ G03B 3/10
[58] Field of Search ........ 354/25, 200, 65; 352/140; 250/201, 204; 353/101; 356/123

[56] References Cited
UNITED STATES PATENTS

| | | | |
|---|---|---|---|
| 3,367,254 | 2/1968 | Townsley | 354/25 |
| 3,500,733 | 3/1970 | Kreuz et al. | 354/65 X |
| 3,532,045 | 10/1970 | Genahr | 354/25 |
| 3,691,922 | 9/1972 | Konig et al. | 354/25 |
| 3,776,639 | 12/1973 | Stauffer | 250/201 X |
| 3,783,269 | 1/1974 | McConnell | 250/201 |

Primary Examiner—Samuel S. Matthews
Assistant Examiner—James LaBarre
Attorney, Agent, or Firm—J. Gibson Semmes

[57] ABSTRACT

Automatic focusing method and apparatus for an adjustable focus lens system wherein the object to be focused is projected on the screen while the adjustable lens is continuously moved through its focusing range. The image formed on the screen is scanned by a photoelectric device whose output is monitored to determine when it contains a maximum of high frequency components, which coincides with the position of sharpest focus of the adjustable lens.

2 Claims, 2 Drawing Figures

AUTOMATIC LENS FOCUSING METHOD AND APPARATUS

BACKGROUND OF THE INVENTION

The present invention relates to a method and apparatus for automatic focusing of a lens system. An operator initiates the sequence by pointing the lens system at a field of view of interest. When the operator pushes a button, the adjustable lens begins to continuously move through its range of focus projecting an image on a screen. A photoelectric scanner monitors the image formed on the screen. The signal levels produced at the output of the photoelectric device are a function of the density of the elements of the image scanned. The rate of change of signal level is thus a function of the rate of change of density of the element scanned. When a sharply defined image is scanned, the scanner's output contains a relatively high percentage of high frequency components. This high frequency signal characteristic is detected and used to automatically focus the lens system.

It is an important and novel feature of this invention that the utilization of high frequency components in the output of the photoelectric detector to determine sharp focus does not involve an averaging or integrating process which has been used in the past. The present invention individually samples small sections of the entire image area of interest rather than taking a small "representative" sample as taught by Pat. No. 3,274,913 to Biedermann et al., or by integrating over a larger area as taught by Pat. No. 3,713,371 to Kurihara et al.

SUMMARY OF THE INVENTION

The primary object of the present invention is to provide a method and apparatus for automatic focusing of a lens system to automatically shift the lens system to a position where it may form a sharp image.

Another object of the present invention is to provide a method and apparatus for automatically focusing on a subject with a high degree of accuracy.

The lens system may be incorporated into a variety of optical apparatus — such as a camera, a projector, a microscope, etc. The scanning signal may be developed by scanning the optical axis of a photoelectric device over the field of view of interest, or by observing the output of devices which inherently contain an image scanner, such as electron microscopes or character readers and photoelectric matrices in general and particularly those coordinated with charge-coupled devices.

In brief, the present invention operates as follows

An object is viewed by a variable focus system. As the focus of the lens system is varied, the image produced by the lens system is monitored by a scanning apparatus which converts the received optical signal to an electrical signal. The frequency spectrum of the electrical output of the scanner is used to define the sharpness of the focus of the image viewed by the variable focus lens system, in that the electrical signal will contain a relatively large portion of high frequency components when the image is sharply focused, and relatively more low frequency components when the image is not sharp. The focus of the lens system is initially continually varied, to allow optimizing the focus determination. After a sharp focus position of the lens system has been established, the focusing system can be arrested at the point of sharpest focus, or measurement or recording of an image produced by the lens system can be automatically accomplished as the lens passes through the point of sharpest focus without stopping the focusing apparatus.

The novel features which are considered as characteristic for the invention are set forth particularly in the appended claims. The invention itself, however, will be best understood from the following description of a specific embodiment when read in combination with the drawings.

DESCRIPTION OF THE PREFERRED EMBODIMENT

Figure 1:
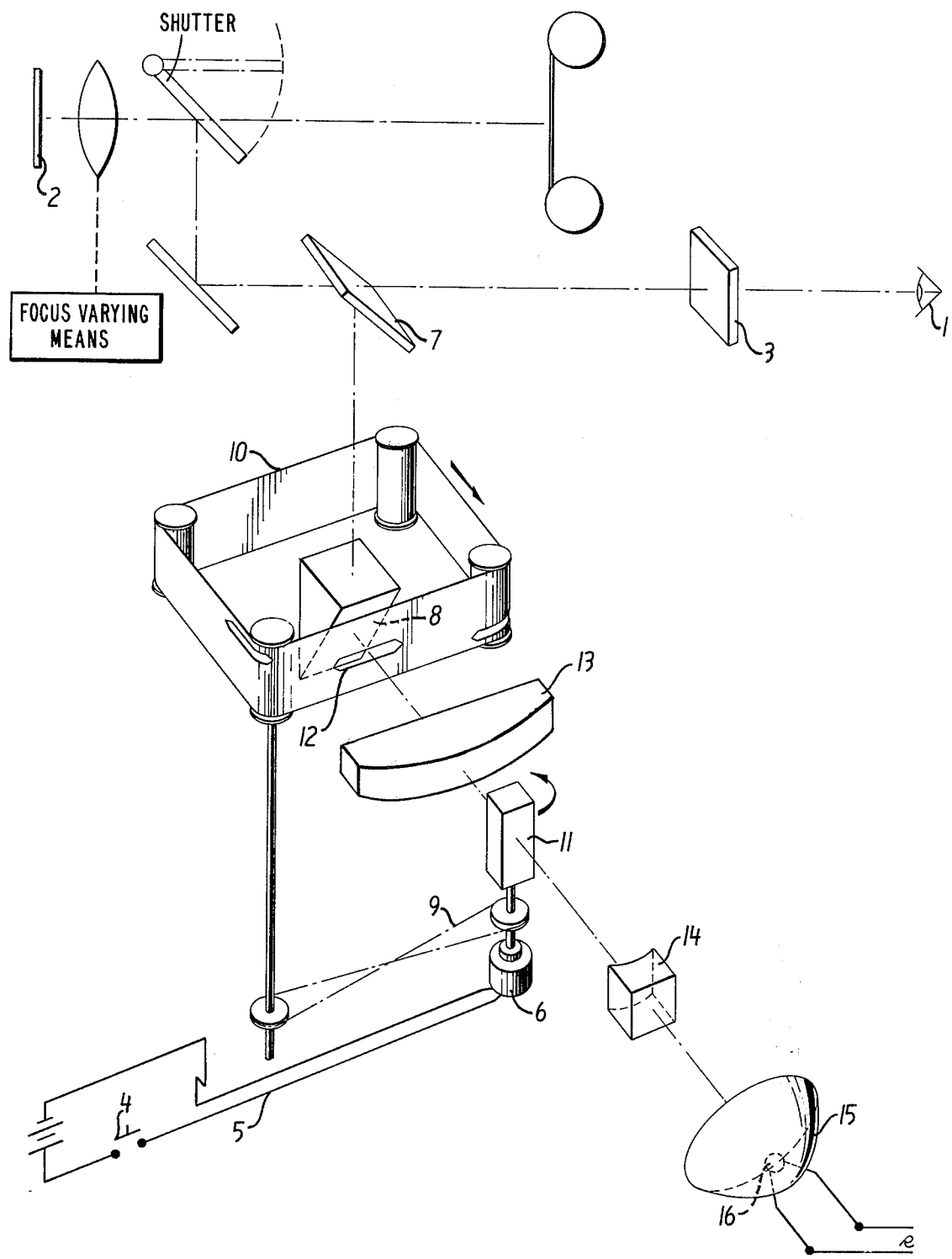
FIG. 1 is a schematic diagram of a focusing arrangement of the present invention.
Figure 2:
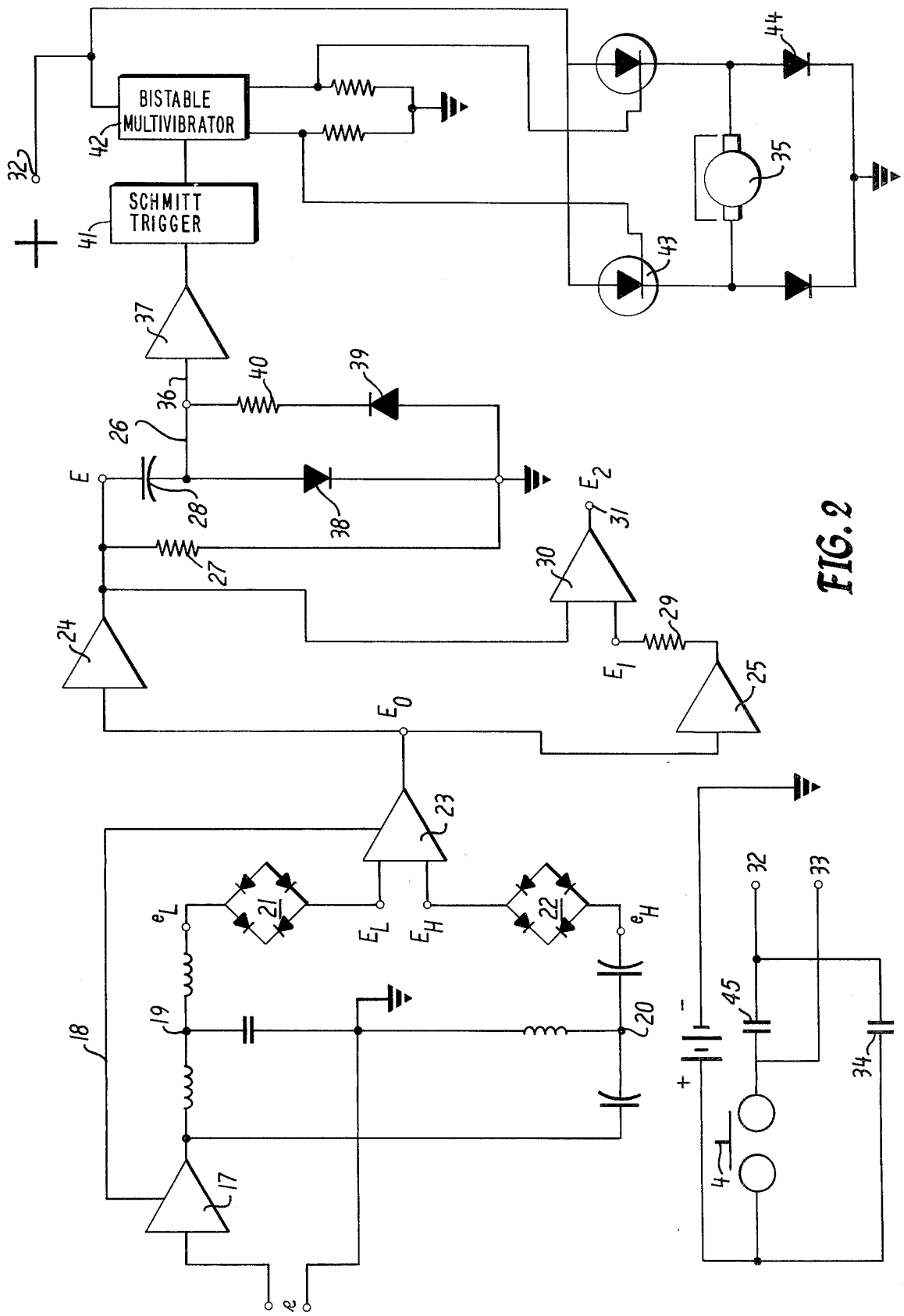
FIG. 2 is a circuit diagram of the discriminator and focus correction circuits of the present invention.

A preferred embodiment of the present invention will now be described with reference to the drawings While the preferred embodiment described below involves a camera system, it is to be understood that this invention is equally applicable to other adjustable focus devices, such as microscopes, character readers, etc. The operator 1 of a single lens reflex camera imposes the image of object 2 on screen 3. He then presses "take" button 4 to power electrical bus 5 which starts, among other elements, scanning motor 6. Half mirror 7 reflects the picture onto screen 8. Motor 6 through transmission 9 drives a slotted, continuous belt 10. Dimensions of the length of the slots are not critical and may be as long as the width of screen 8. A prism 11, rotated by motor 6, scans screen 8 through, for example, slot 12. As the slots move in synchronism with prism 11, a continuous look at screen 8 is afforded from one vertical edge of screen 8 to the opposite edge. When slot 12 exposes an area of screen 8 to lens 13, a part of the image on screen 8 will be focused by lens 13 through prism 11 and lens 14 into parabolic reflector 15 and on to photoelectric device 16. As prism 11 rotates, the exposed image strip is swept past the photoelectric device and the image's varying densities will give rise to a modulated electrical output, which will appear as $e$. See FIG. 2. The photoelectric detector output $e$ is a stream of random pulses, having variable peak voltages and variable rise times. Output $e$ is fed into wide band amplifier 17 with automatic gain control 18 from amplifier 23. The output of 17 is fed into two circuits simultaneously: one circuit is a low-pass filter 19 with an output $e_L$. The other is a high-pass filter 20 with an output $e_H$. $e_H$ becomes predominant as a sharply focused image gives rise to commensurately sharper pulses. The signals $e_H$ and $e_L$ are individually full wave rectified by high frequency diode bridges 21 and 22 and then fed to differential amplifier 23. The output from amplifier 23 $E_o = (E_H - E_L) A \geq 0$, where A is the amplification factor of this stage. The output $E_o$, essentially an amplitude modulated dc, is fed into two identical amplifiers 24 and 25. Output from 24 feeds the long time constant circuit 26. Amplifier 24 and circuit 26 are designed to charge capacitor 28 essentially as a function of the time integral of voltage $E_o$. Connected across capacitor 28 is a bleeder resistor 27 to give this whole section the characteristics of a memory that slightly lags behind real time. This memory is constantly being updated by amplifier 24 output so that it may reach, eventually, a peak value $\dot{E}$ during memorization period $t_0$ to $t_1$. The voltage on capacitor 28 may be thought of as an analog of the optimum definition of the scanned matter during the memorization period. This voltage Ė is fed into one side of balanced amplifier 30.

Amplifier 25 feeds the resistive circuit 29 so that an output $E_1$ appears in real time at the input to balanced amplifier 30. This amplifier operates so that its output $E_2 = (Ė - E_1) A \leq 0$. As the system just begins to operate or during operation $E_1$ may be higher than Ė i.e. the instantaneous output is higher than the memory. This causes no output from amplifier 30. The memory will be fed long enough to attain a voltage approximating $E_1$. At that instant an output starts appearing on terminal 31. In practice it is anticipated that amplifier 30 will be intentionally unbalanced to a small degree, so that E reaches $E_1$ in less time than it would have if the gain of both sides of amplifier 30 had been identical. This degree of imbalance is held to such a value that even though the last possible degree of focus sharpness has not been reached, the focus will be within acceptable depth of focus range. Voltage $E_2$ is the firing signal and can be used by the designer of the camera to suit the peculiarities of the mechanism.

The succeeding paragraphs will outline the operation of the focus correction procedure which goes on simultaneously with the steps outlined above. On completion of taking the previous picture, the shutter operated limit switch 45 stopped power to terminal 32. Subsequent release of push button 4 removed power to the electronics. The normally closed contacts of limit switch 34 fed motor bus 32 to let motor 35 return the objective system to its rest position at long focus and there opened normally closed limit switch 34 to disconnect power from the motor. On taking the following picture, the film crank cocked the shutter, closed normally open switch 45 thereby, operator through push button 4 energized terminals 32 and 33, powering the motor bus around 34. Thus, the motor goes out of rest position and thereby closes 34. The motor drive of the objective lens moves that assembly toward focus and may go through a continuous excursion from one extreme end of its travel to the other on one rotational direction of motor 35. On reversing the motor the same will happen in the opposite direction. Motor 35 drives the optics whenever there is a soft focus which causes current flow into condenser 28 from amplifier 24, keeping point 36 slightly positive by the diode 38 drop. By design, no output results from terminal 36 being at a potential higher than or equal to zero. However, in time the optics go through sharp focus and current from amplifier 24 will be maximum and charges condenser 28 to near E. At that time, current through diode 38 stops and reverses by way of diode 39, a sign that sharp focus has just been passed. Voltage drops across resistor 40 which causes amplifier 37 to give an output which triggers Schmitt Trigger 41. The resulting square pulse will flop the bistable multivibrator 42 and hold it flopped for an instant to prevent hunting. This multivibrator previously had the motor running in a certain direction by having fired, for example, thyristor 43 which ran motor 35 via diode 44 in, for example, a clockwise direction, moving the optics toward good focus from rest position. With approach to optimum focus came maximum input to condenser 28 and immediately thereafter, the signal to reverse. As the motor drives the optics back toward and slightly past best focus, the same action again occurs. In each case the overrun is corrected. In case the overrun is large, the total system corrects it. In case it is small, the holding action of the Schmitt Trigger on the bistable multivibrator 42 will correct it. The overrun will become less and less as the system acquires less and less momentum with each reversal resulting in a shorter and shorter motor run. Such hunting action need not take more than one cycle as the passing of best focus will quickly charge capacitor 28 to E and initiate triggering action to expose, which ends the whole cycle.

There are, of course, a number of alternate configurations possible dependent upon the particular application. For example, if the above described apparatus were to be applied to a movie camera or facsimile system, the stopping of the motor, removal of power and other features would have to be omitted to permit continuous operation. Or, the operator of a camera may be given a choice to trigger the camera automatically when a very contrasty object is to be photographed. Knowing what voltage must appear at 36, the operator switches in the appopriate bias and then lets $E_1$ trigger as it approaches good output due to good focus.

Another alternative which in no way diminishes the importance of the principle that "good focus equals high frequency output" is to work with the instantaneous value of $E_1$ without a memory. This is particularly applicable in installations where the material is to be focused repeatedly and values for the input to amplifier 25 can be preset. The positive output for memory can be simulated by a fixed bias.

The invention has been described in detail with particular reference to preferred embodiments thereof, but it will be understood that variations and modifications can be effected within the spirit and scope of the invention. Accordingly, the invention is not to be limited to the specific details shown and described but is of a scope as defined by the appended claims.

I claim:

1. In an automatic focusing camera of the type comprised of a camera lens; means for focusing the image to be photographed; a screen upon which the image is focused, and a shutter, where the improvement comprises:

means to vary the focus of said camera lens between two positions;

photoelectric scanning means to optically scan the image focused upon said screen to derive a corresponding electrical output signal comprising a closed-loop slotted belt surrounding said screen, means to rotate the belt around the screen, the slots being so arranged that as the slotted belt rotates successive slots expose successively different horizontal segments of the screen at a given time;

a rotating prism which scans the screen through the slots;

lens means to focus the successive horizontal segments of the image on the screen defined by the slots and transmitted through the slots and prism, a photoelectric device for sensing the light passing through said lens means; the entire image on the screen thereby being scanned during each cycle of rotation of the belt;

said means to rotate the slotted belt also synchronously rotating the prism, and discrimination means to determine when the electrical output of said photoelectric device contains a maximum of high frequency components indicative of sharp focusing of the image and to control said means to vary the focus accordingly.

2. In the automatic focusing camera of claim 1 wherein the means to vary the focus are made disoperative upon obtaining a determination of maximum high frequency components and the camera shutter is then automatically tripped.

* * * * *